United States Patent
Giangrasso

(10) Patent No.: US 7,195,233 B2
(45) Date of Patent: Mar. 27, 2007

(54) AERATOR

(75) Inventor: Antonio Giangrasso, Nuremberg (DE)

(73) Assignee: Pfleiderer Water Systems GmbH, Neumarkt (DE)

( * ) Notice: Subject to any disclaimer, the term of this patent is extended or adjusted under 35 U.S.C. 154(b) by 0 days.

(21) Appl. No.: 10/512,272

(22) PCT Filed: Jul. 26, 2002

(86) PCT No.: PCT/EP02/08396

§ 371 (c)(1),
(2), (4) Date: Oct. 22, 2004

(87) PCT Pub. No.: WO03/091169

PCT Pub. Date: Nov. 6, 2003

(65) Prior Publication Data

US 2005/0146063 A1 Jul. 7, 2005

(30) Foreign Application Priority Data

Apr. 23, 2002 (DE) .............................. 102 18 073

(51) Int. Cl.
*B01F 3/04* (2006.01)
(52) U.S. Cl. ............. 261/122.1; 261/124; 261/DIG. 70
(58) Field of Classification Search ............. 261/121.1, 261/122.1, 122.2, 124, DIG. 70
See application file for complete search history.

(56) References Cited

U.S. PATENT DOCUMENTS

| | | | |
|---|---|---|---|
| 1,117,601 A * | 11/1914 | Porter | .......................... 210/503 |
| 2,297,248 A | 9/1942 | Rudolph | |
| 3,644,231 A * | 2/1972 | Maruya et al. | ................. 521/54 |
| 3,970,731 A * | 7/1976 | Oksman | ................... 261/122.1 |
| 4,071,445 A * | 1/1978 | Katayama et al. | ........... 210/655 |
| 5,422,043 A * | 6/1995 | Burris | ...................... 261/122.1 |
| 5,560,874 A * | 10/1996 | Sheckler et al. | .......... 261/122.1 |
| 5,560,875 A * | 10/1996 | Meshengisser et al. | .. 261/122.1 |
| 5,679,248 A | 10/1997 | Blaney | |
| 6,030,558 A | 2/2000 | Smith et al. | |
| 6,199,836 B1 * | 3/2001 | Rexford et al. | ................ 261/87 |
| 2003/0038386 A1* | 2/2003 | Parayre et al. | ............ 261/122.1 |

FOREIGN PATENT DOCUMENTS

| | | |
|---|---|---|
| DE | 4016244 | 11/1991 |
| DE | 4214099 | 11/1992 |
| DE | 4337091 | 5/1995 |
| DE | 19955973 | 2/2002 |
| EP | 1101873 | 5/2001 |
| GB | 1051032 | 12/1966 |
| RU | 2071955 | 1/1997 |
| RU | 2169706 | 6/2001 |
| SU | 340151 | 12/1972 |
| SU | 1463722 | 3/1989 |

OTHER PUBLICATIONS

International Search Report of PCT/EP02/08396 (EP Search Authority), Feb. 10, 2003, 3 pages.

* cited by examiner

*Primary Examiner*—Scott Bushey
(74) *Attorney, Agent, or Firm*—Fitch, Even, Tabin & Flannery

(57) ABSTRACT

The invention relates to an aerator consisting of a porous plastic moulded body with pores that are smaller on the air outflow side (A) than on the air inflow side (B) lying opposite. The inventive aerator is particularly suitable for use in sewage treatment plants.

17 Claims, 1 Drawing Sheet

AERATOR

Figure 1:
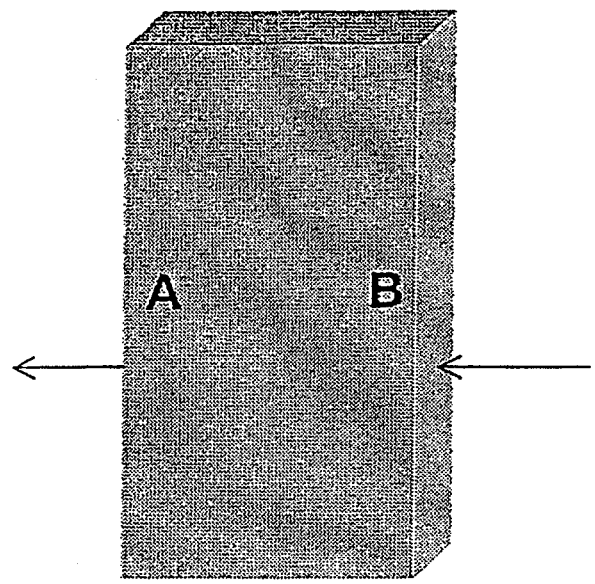

This application is a U.S. national phase application filed under 35 U.S.C. § 371 of international application PCT/EP02/08396, filed on Jul. 26, 2002, designating the United States, which claims the benefit of Germany Ser. No. 10218073.3, filed on Apr. 23, 2002, which are hereby incorporated by reference herein.

The present invention relates to an aerator consisting of a plastic moulded body and to the production of the same. The aerator according to the invention is particularly suitable for use in sewage treatment plants.

Primarily the ability of microorganisms to oxidise organic pollutants while consuming oxygen is exploited in most of the biological processes used today in sewage treatment. So that a sufficient amount of oxygen is available to the microorganisms, air must be introduced into the sewage. The air supply is furthermore supposed to cause a conversion of ammonium ions into nitrate so as to thus reduce the ammonium content in the sewage.

The aeration of the sewage normally occurs by blowing in air via porous aerators. These aerators are made, for example, of a ceramic material, the disadvantage of which, however, is that it is relatively brittle and thus breakable. Ceramic materials furthermore have a rough surface, on which deposits and incrustations can easily form, which then causes blockages of the aerator.

It is furthermore known to use moulded bodies made of elastomers and provided with continuous slots as aerators. The disadvantage, however, is that such aerators have a high pressure loss, have high wear owing to their production process and can only be subjected to low volume flows. The elastomers are furthermore normally made of EPDM and are thus not chemically resistant to all types of sewage.

The object forming the basis for the present invention is therefore to provide an aerator having a low pressure loss, good mechanical stability, high durability and a high oxygen yielding performance and which can be easily cleaned of deposits and incrustations.

This object is solved by means of an aerator consisting of a porous plastic moulded body with pores that are smaller on the air outflow side (A) than on the air inflow side (B) lying opposite.

In order to produce the aerator according to the invention, a plastic material in the form of a granulate or powder is sintered in a mould such as a sintering mould. The mould filled with the plastic granulate or powder is heated in a sintering furnace to a greater temperature on one side (A) than on the opposite side (B), as a result of which the plastic material used in the form of a granulate and/or powder is sintered together to a greater extent on the hotter side than on the opposite side, whereby resulting in pores having a smaller pore diameter being formed on side (A) than on side (B).

During sintering, the grains of the plastic granulate and/or powder only begin to melt at the surface but do not melt all the way through, thereby resulting in a sintered composite which, after cooling, leads to a well adhered and stable moulded body that is nevertheless porous. The temperature at which the grains of the plastic granulate and/or powder begin to melt solely at the surface, however not all the way through, is referred to in the following as the "melting temperature".

The plastic moulded body should preferably be made of a high or ultra-high molecular weight material in order to prevent the plastic material melting together to too great an extent and also an inferior formation of pores. Polyethylene (having a high molar mass (approximately 200,000 to 5 million g/mol), abbreviation: HD-HMW-PE, or having an ultra-high molar mass (3 million to 6 million g/mol), abbreviation: UHMW-HD-PE) or also polypropylene is preferably used in the present invention. Polyethylene having an average density can sometimes also be used, provided that the temperature treatment is carried out carefully so as to avoid complete melting. The higher molecular weight materials are, however, preferably used.

The average grain size of the plastic granulate or powder used should preferably be in the range of between 1 µm and 5 mm. The use of a granulate in which 80% of the grains are larger than 500 µm, a powder in which 65% of the grains have a size of 250 to 500 µm or a mixture thereof, is particularly preferred.

The sintering temperature and the duration of the sintering treatment is selected such that the desired degree of bonding together with the desired porosity is achieved. The sintering temperature is preferably in the range of between 80° C. and 220° C., preferably between 120° C. and 160° C., depending on the plastic material used. For example, a sintering temperature of 150° C. should ideally be selected for a plastic having a melting temperature of 80° C. The duration of the temperature treatment is preferably in the range of between 30 minutes and 180 minutes, in particular 60 minutes to 120 minutes. The duration of the temperature treatment must be selected such that a complete heating through of the plastic granulate or power from side (A) to the side (B) lying opposite is ensured.

It has proven particularly advantageous if a temperature gradient of 1 to 25° C., preferably 5 to 15° C., is established between side (A) and side (B) during the temperature treatment.

The pores of the aerator according to the invention preferably have an average diameter on the air outflow side (A) in the range of 1 µm to 1500 µm, particularly preferred 10 µm to 1000 µm, and an average diameter on the air inflow side (B) preferably in the range of 5 µm to 3000 µm, particularly preferred 20 µm to 1500 µm. Furthermore, the average pore diameter on the air outflow side (A) is preferably 20 to 80% smaller than the average pore diameter on the air inflow side (B).

The aerator according to the invention preferably has a thickness of 2 to 30 mm, particularly preferred 3 to 12 mm.

In addition to the exceedingly simple production, the size of the pores can be adjusted as desired depending on the selection of the size of the granular or powdered plastic material, the duration of the temperature treatment and the heating temperature. Therefore, aerators having different porosities can be produced in a simple manner. An additional advantage is that no additives such as resins, adhesives or the like are required for the production of the aerators according to the invention.

It has proven particularly expedient if at the end of the temperature treatment the temperature is temporarily increased for the specific heating of the outer surface layer of side (A) of the aerator. The outer layer of the aerator is hereby temporarily heated to a higher temperature so that the plastic material melts together here to a somewhat greater extent and an even smaller pore diameter results thereat.

Aerators of any type, preferably plate-like or tube-like aerators, can be produced using the manufacturing process described above.

The invention is described below by means of the enclosed figures, wherein

Figure 2:
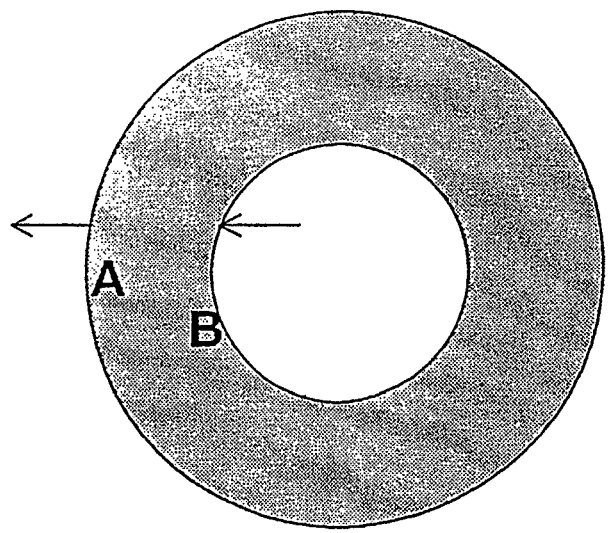

FIG. 1 and FIG. 2 show aerators produced according to the invention. FIG. 1 in particular is a view of an aerator that can be used as a plate-like aerator, whereas FIG. 2 shows a view of an aerator that can be used as a tube-like aerator. The arrows in FIGS. 1 and 2 indicate the direction in which air flows through the aerator.

The plate-like aerator shown in FIG. 1 has smaller pores on its air outflow side labelled with (A) than on the air inflow side which is labelled with the letter (B). When employed in a sewage treatment plant, the aerator is used such that the air outflow side (A) having the smaller pores is facing the sewage into which the air is supposed to be introduced.

In the case of the tube-like aerator shown in FIG. 2, the smaller pores are on the outer side (A) of the tube and the larger pores are on the inner side (B) of the tube. The side (A) having the smaller pores, i.e. the outer side of the tube, also faces the sewage to be aerated in this case as well. When aerating the sewage, air flows from the inner side (B) of the tube to the outer side (A) of the tube where it is directed into the sewage.

In the case of the tube-like aerator, it is possible to mount a central tube provided with slots on the inner side of the tube for reinforcement. This tube is preferably made of PVC or temperature-resistant polyethylene.

Provision can be made when producing the tube-like aerator reinforced with a central tube for the central tube to be cooled on the inner side before or after conclusion of the temperature treatment. The central tube, which is also heated to some extent during the temperature treatment, is hereby almost quenched in order to prevent it from being pressed together during cooling owing to the shrinking of the plastic material that occurs.

Owing to the property that the pore diameter on the air outflow side (A) is smaller than on the air inflow side (B) lying opposite, a lower pressure loss is achieved when air is flowing through than is the case for a material having uniform pore sizes. A lower pressure loss in turn enables effective gasification at low pressures, whereby achieving a high yield of the available aerator performance. The surface of the aerator can furthermore be very easily freed from deposits and incrustations, for example by means of simple shock aeration. The aerators are finally extremely mechanically stable and break-resistant.

EXAMPLE

Production of a Tube-Like Aerator

A circular aluminium mould that can be heated using a heating jacket is used as a sintering oven, in the middle of which a core bar, also made of aluminium, is positioned. The clearance between the core bar and the aluminium mould is filled with 610 g of HDPE granules ($\rho=0.952-0956$ g/cm$^3$, 80% of the grains >500 μm) which is shaken in. The clearance between the aluminium mould and the core bar is 5 mm, and thus the resulting aerator has a corresponding wall width, i.e. thickness. The mixture is sintered by heating the aluminium mould using a heating jacket to 150° C. for 70 minutes. The temperature gradient between the side facing the aluminium mould and the side facing the core bar is approximately 7° C. Cooling to room temperature and removal from the mould then occurs.

The aerator produced in this manner comprises a pore size on the air outflow side (A) in the range of 150 to 350 μm, with an average pore diameter of 290 μm, and a pore size on the air inflow side (B) in the range of 400 to 850 μm, with an average pore diameter of 490 μm.

In order to determine the pore size, sample pieces were cut from the aerator and were examined both in a stereomicroscope as well as under a scanning electron microscope. The pore sizes were determined by measuring in the corresponding images.

The average pore diameters specified here represent the arithmetic mean determined from a plurality of specifically measured pore diameters.

The invention claimed is:

1. A method for aerating waste water, the method comprising:
   providing a porous aerator in the waste water; and
   blowing air through the porous aerator into the waste water, the aerator having an air inflow side and an opposite outer air outflow side which faces the waste water, the air proceeding through pores in the inflow side and out the outflow side into the waste water, the aerator including
   a sintered porous plastic body having the pores that are smaller on the air outflow side than the pores on the air inflow side.

2. The method of claim 1 wherein the sintered porous plastic body is selected from the group consisting of sintered polyethylene and sintered polypropylene.

3. The method of claims 1 or 2 wherein the pores have an average diameter of 1 μm to 1500 μm on the outflow side and an average diameter of 5 μm to 3000 μm on the inflow side.

4. The method of claims 1 or 2 wherein the pores have an average pore diameter on the outflow side which is 20 to 80% smaller than the average pore diameter on the inflow side.

5. The method of claim 3 wherein the pores have an average pore diameter on the outflow side which is 20 to 80% smaller than the average pore diameter on the inflow side.

6. A method for aerating waste water, the method comprising:
   blowing air through a center passage of a sintered porous plastic tubular aerator in the waste water, the aerator having a tubular wall which has a center inflow side and an opposite outer air outflow side which faces the waste water, the air proceeding through pores in the sintered plastic from the center passage through the inflow side and out the outflow side of the pores smaller on the air outflow side than the pores on the air inflow side.

7. The method of claim 6 wherein the sintered porous plastic tubular body is selected from the group consisting of sintered polyethylene and sintered polypropylene.

8. The method of claim 6 or 7 wherein the pores have an average diameter of 1 μm to 1500 μm on the outflow side and an average diameter of 5 μm to 3000 μm on the inflow side.

9. The method of claim 6 or 7 wherein the pores have an average pore diameter on the outflow side which is 20 to 80% smaller than the average pore diameter on the inflow side.

10. The method of claim 8 wherein the pores have an average pore diameter on the outflow side which is 20 to 80% smaller than the average pore diameter on the inflow side.

11. A method for utilizing a sintered porous tubular plastic body having a center passage in aerating waste water, the method comprising:
    blowing air through the center passage of the sintered porous tubular plastic body into the waste water, the sintered porous tubular plastic body having a tubular wall which has a center inflow side and an opposite outer air outflow side which faces the waste water, the air proceeding from the center passage through the inflow side and out the outflow side of the wall, the sintered porous plastic tubular body having pores which the air passes through, the pores smaller on the air outflow side than the pores on the air inflow side, the sintered porous plastic tubular body being made from heated plastic particles having an average grain size of from 1 µm to 5 mm, the particles having been heated at a higher temperature on the outflow side than the inflow side, and the particles being selected from the group consisting of particulate polyethylene, particulate polypropylene and mixtures thereof.

12. The method of claim 11 wherein the particulate polyethylene has a molecular weight is the range of from 200,000 to 6 million g/mol.

13. The method of claim 11 wherein the pores have an average diameter of 1 µm to 1500 µm on the outflow side and an average diameter of 5 µm to 3000 µm on the inflow side.

14. The method of claim 11 wherein the pores have an average pore diameter on the outflow side which is 20 to 80% smaller than the average pore diameter on the inflow side.

15. A method utilizing a sintered porous plastic body in aerating waste water, the method comprising:
  blowing air through the sintered porous plastic body, the sintered porous plastic body having a wall which has an inflow side and an opposite outer air outflow side which faces the waste water, the air proceeding from a passage through the inflow side and out the outflow side of the wall, the wall being made by
  (a) filling a mould with a particulate plastic selected from the group consisting of polyethylene, polypropylene and mixtures thereof, the plastic particles having an average grain size of from 1 µm to 5 mm, the mould defining at least two surfaces for the particulate plastic;
  (b) heating the mould filled with the particulate plastic until the particulate plastic at the surfaces of the particles begin to melt to provide for a sintered plastic wall, one surface of the plastic defining an air outflow surface of the wall and one surface of the plastic defining an air inflow surface of the wall, the sintered plastic at the outflow side of the wall heated to a greater temperature than the inflow side, the heating being for a time and temperature effective for providing the wall with pores having an average diameter of 1 µm to 1500 µm on the outflow side and an average diameter of 5 µm to 3000 µm on the inflow side and providing an average pore diameter on the outflow side which is 20% to 80% smaller than the average pore diameter on the air inflow side, the temperature during heating having a gradient of from 1° C. to 25° C. between the sides, the heating being from 80° C. to 220° C.;
  (c) cooling the sintered plastic wall, and
  (d) removing the sintered plastic wall body from the mould.

16. The method for aerating waste water of claim 1, wherein the plastic has been heated at a higher temperature on the outflow side than the inflow side.

17. The method for aerating waste water of claim 6, wherein the plastic has been heated at a higher temperature on the outflow side than the inflow side.

* * * * *